(12) United States Patent
Michael

(10) Patent No.: US 7,309,071 B1
(45) Date of Patent: Dec. 18, 2007

(54) EXERCISE STROLLER DEVICE

(76) Inventor: Tammy Michael, 60 Hickory La., Sandwich, IL (US) 60548

( * ) Notice: Subject to any disclaimer, the term of this patent is extended or adjusted under 35 U.S.C. 154(b) by 0 days.

(21) Appl. No.: 11/511,099

(22) Filed: Aug. 28, 2006

Related U.S. Application Data

(60) Provisional application No. 60/715,197, filed on Sep. 9, 2005.

(51) Int. Cl.
*B62B 7/00* (2006.01)

(52) U.S. Cl. .............. 280/47.34; 280/47.371; 280/47.38

(58) Field of Classification Search ............ 280/47.34, 280/47.38, 47.371, 642, 647, 650, 658; 482/121, 482/122, 126
See application file for complete search history.

(56) References Cited

U.S. PATENT DOCUMENTS

| | | | | |
|---|---|---|---|---|
| 5,665,040 A | * | 9/1997 | Ho | 482/126 |
| 5,674,165 A | * | 10/1997 | Cohen et al. | 482/127 |
| 5,876,309 A | * | 3/1999 | Archey | 482/66 |
| 6,196,947 B1 | * | 3/2001 | Anderson | 482/51 |
| 6,722,689 B2 | * | 4/2004 | Kreamer | 280/642 |

* cited by examiner

*Primary Examiner*—Katy Meyer

(57) ABSTRACT

An exercise stroller device for exercising a user's arms, shoulders, and chest muscles while walking, strolling, or running with an infant is provided. The exercise stroller device comprises a base unit, a plurality of wheels secured to the base unit, and a seat secured to the base unit with the infant receivable within the seat. A first handle is pivotally mounted to the base unit and a second handle is pivotally mounted to the base unit opposite the first handle. A resistance mechanism is releasably secured between the first handle and the second handle with the resistance mechanism providing resistance of movement between the first handle and the second handle wherein the first handle and the second handle are in a first position, wherein the first handle and the second handle are movable in a generally outward direction relative to each other against the resistance of the resistance mechanism to a second position, and wherein the first handle and the second handle automatically return to the first position.

20 Claims, 1 Drawing Sheet

EXERCISE STROLLER DEVICE

The present application claims benefit of priority of pending provisional patent application Ser. No. 60/715,197, filed on Sep. 9, 2005, entitled "Exercise Stroller".

BACKGROUND OF THE INVENTION

1. Field of the Invention

This invention relates generally to an exercise stroller device and, more particularly, the invention relates to an exercise stroller device providing beneficial cardiovascular activity while exercising the leg muscles and toning and the strengthening the upper body.

2. Description of the Prior Art

The anticipated arrival of a new baby is a joyous time for most couples. As the expectant mother's belly swells, an expectant father might help out by transforming his den or office into a newly decorated nursery. As diapers, bottles, and other accessories are purchased, birthing classes are attended and books are read, the coming birth is made all the more meaningful with each passing day. Friends, grandparents-to-be, and other family members give thoughtful advice to the expectant parents and baby showers are thrown honoring the blessed event.

While there is little dispute that the occasion of a child's birth is a joyous time in most new parent's life, many new parents, particularly new mothers, find that the time spent caring for the baby can take away from time spent caring for oneself. Specifically, many new mothers are faced with the dilemma of getting in a few minutes of exercise when caring for an infant. Exercise is a crucial factor in maintaining overall health, enabling an individual to lose weight, tone muscles, burn fat, and increase stamina. Considering that an average woman gains an approximately 25-35 pounds during healthy, full-term pregnancy, many women depend on exercise to get their body back into pre-pregnancy shape. A popular way in which many new moms exercise is by taking a leisurely walk, brisk stroll, or even a fast paced jog, while pushing their child in an infant stroller. Enabling the busy parent to enjoy a cardiovascular activity while they and their child enjoy fresh air and bright sunshine of the outdoors, pushing a child in an infant stroller can be to both the parent and their infant.

Although a beneficial cardiovascular activity and one which exercises the leg muscles, pushing a conventional infant stroller unfortunately does little to tone and the strengthen the upper body.

SUMMARY

The present invention is an exercise stroller device for exercising a user's arms, shoulders, and chest muscles while walking, strolling, or running with an infant. The exercise stroller device comprises a base unit, a plurality of wheels secured to the base unit, and a seat secured to the base unit with the infant receivable within the seat. A first handle is pivotally mounted to the base unit and a second handle is pivotally mounted to the base unit opposite the first handle. A resistance mechanism is releasably secured between the first handle and the second handle with the resistance mechanism providing resistance of movement between the first handle and the second handle wherein the first handle and the second handle are in a first position, wherein the first handle and the second handle are movable in a generally outward direction relative to each other against the resistance of the resistance mechanism to a second position, and wherein the first handle and the second handle automatically return to the first position.

The present invention further includes a method for exercising a user's arms, shoulders, and chest muscles while walking, strolling, or running with an infant. The method comprises providing a stroller having a base unit, a plurality of wheels secured to the base unit, and a seat secured to the base unit, pivotally mounting a first handle to the base unit, pivotally mounting a second handle to the base unit opposite the first handle, providing resistance of movement between the first handle and the second handle, initially positioning the first handle and the second handle in a first position, moving the first handle and the second handle in a general outward direction relative to each other to a second position against the resistance, and automatically returning the first handle and the second handle to the first position.

DETAILED DESCRIPTION OF THE PREFERRED EMBODIMENTS

Figure 1:
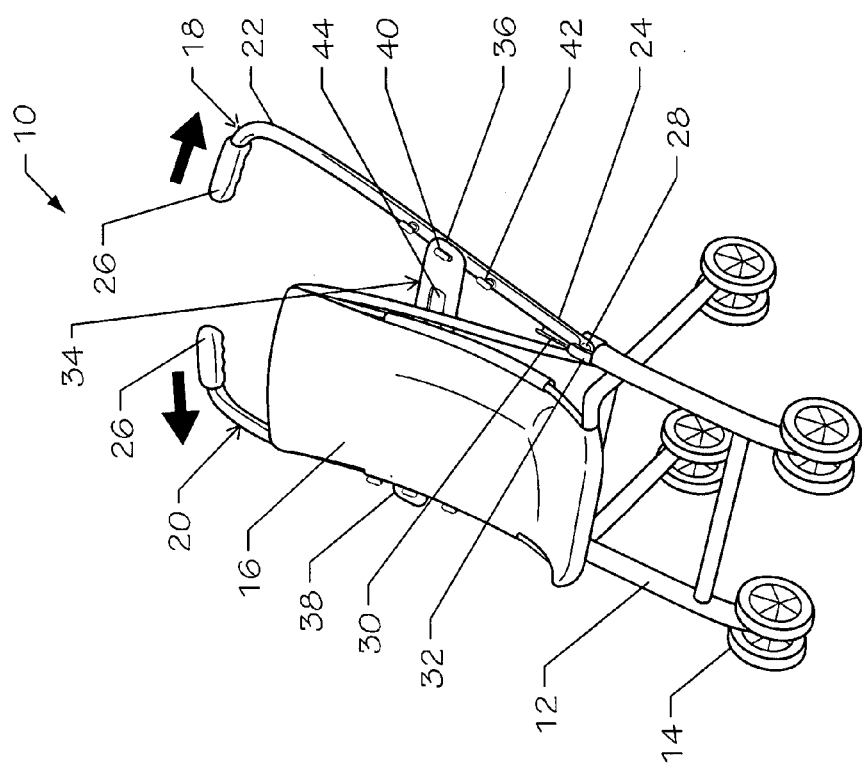
FIG. 1 is a perspective view illustrating an exercise stroller device, constructed in accordance with the present invention.
Figure 2:
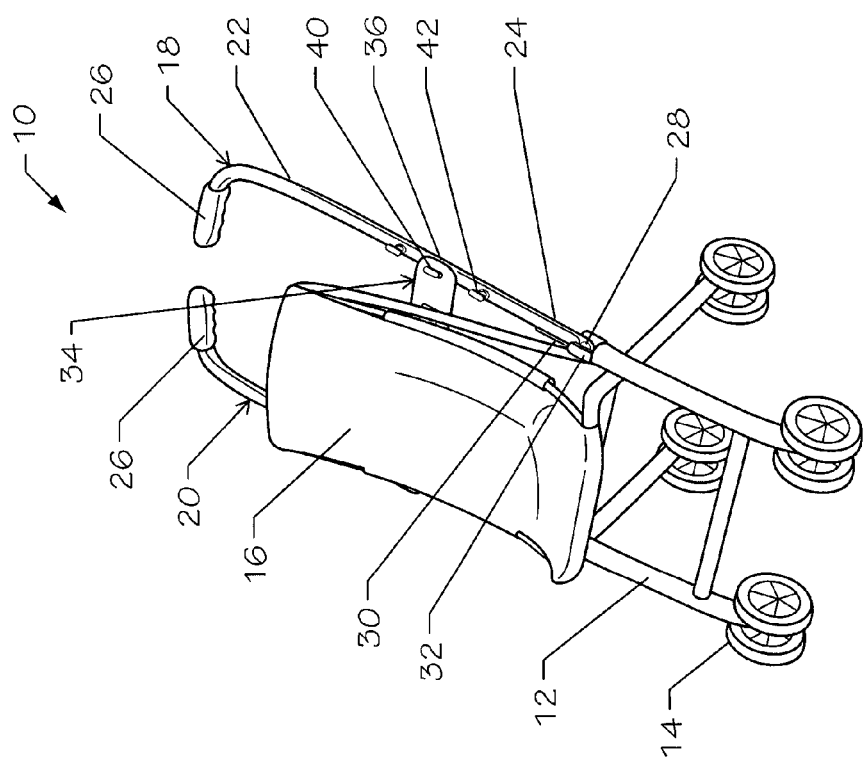
FIG. 2 is a perspective view illustrating the exercise stroller device of FIG. 1, constructed in accordance with the present invention, with an elastic band providing resistance for outward motion.

As illustrated in FIGS. 1 and 2, the present invention is an exercise stroller device, indicated generally at 10, for exercising a user's arms, shoulders, and chest muscles while walking, strolling, or running with an infant. The exercise stroller device 10 includes basic stroller features including, but not limited to, a base unit 12, a plurality of wheels 14 secured to the base unit 12, a seat 16 secured to the base unit 12, a first handle 18, and a second handle 20 with the first handle 18 and the second handle 20 positioned on opposite sides of the base unit 12.

The seat 12 of the exercise stroller device 10 can be an independently suspended, fully adjustable, padded seat with removable snack tray (not shown), as well as include an optional adjustable canopy (not shown) and integrated storage basket (not shown). A cushiony reclined seat together with a five point safety harness system (not shown) can be provided ensuring that a child stays securely fastened in their seat 16 at all times. As will be understood by those persons skilled in the art, many different configurations of the exercise stroller device 10 including, but not limited to, a "jogger" style stroller featuring a three-wheeled construction, are within the scope of the present invention.

The first handle 18 and the second handle 20 of the exercise stroller device 10 of the present invention have a handle grip end 22 and a secured end 24 substantially opposite the handle grip end 22. The handle grip ends 22 of the first handle 18 and the second handle 22 can include handle grips 26 for providing comfort and convenience for the user. While the first handle 18 and the second handle 18 are illustrated herein as being substantially cylindrical in shape, it is within the scope of the present invention for the first handle 18 and the second handle 20 to have any geometrical shape.

The secured ends 24 of the first handle 18 and the second handle 20 of the exercise stroller device 10 are pivotally secured to the base unit 12 allowing the first handle 18 and the second handle 20 to pivot in a generally up and down and/or side to side motion. The secured ends 24 of the first handle 18 and the second handle 20 have an aperture 28 and the base unit 12 includes a pin 30 secured between two plates 32. The pin 30 of the base unit 12 is inserted into the aperture 28 of the secured ends 24 allowing the first handle 18 and the second handle 20 move in an outward motion, for example. Connection between the secured ends 24 of the first handle 18 and the second handle 20 and the base unit 12 can also be configured allowing the first handle 18 and the second handle 20 to move in any direction including, but not limited to, side to side motion.

The exercise stroller device 10 of the present invention includes a resistance mechanism releasably 34 releasably secured between the first handle 18 and the second handle 20. In a preferred embodiment, the resistance mechanism 34 is an elastic band having a first end 36 and a second end 38. The resistance mechanism 34 provides resistance of movement between the first handle 18 and the second handle 20 as the first handle 18 and the second handle 20 are moved in a generally outward direction. Upon release of the first handle 18 and the second handle 20, the first handle 18 and the second handle 20 return to their normal operating position.

Each of the first end 36 and the second end 38 has an aperture 40 for receiving a nub 42 formed on the first handle 18 and the second handle 20 between the handle grip end 22 and the secured end 24. In addition, the elastic band can include a centrally located opening 44. The size and shape of the centrally located opening 44 determines the amount of resistance of the elastic band.

In a preferred embodiment, the first handle 18 and the second handle 20 of the exercise stroller device 10 of the present invention each include three aligned nubs 42. The resistance mechanism 34 can be moved upward or downward on the first handle 18 and the second handle 20 to further vary the level of resistance.

The first handle 18 and the second handle 20 of the exercise stroller device 10 are configured to simultaneously be pushed and pulled in a back and forth motion, providing a cross training work out similar to that provided by elliptical machines and similar upper body equipment. Secondly, the first handle 18 and the second handle 20 are configured for pulling outwards from the base unit 12 of the exercise stroller device 10, enabling the user to mimic the resistance of a "cable crossover" exercise via the exercise stroller device 10. In either case, resistance mechanism is incorporated into in design of the first handle 18 and the second handle 20 ensuring an optimal and safe workout. Because the health and well being of the child is of utmost concern, the exercise stroller device 10 is manufactured in accordance to the stringent safety guidelines for children's product as set forth by the Juvenile Products Manufactured Association (JPMA).

The manner of use of the exercise stroller device 10 of the present invention will now be described. It will be understood by those skilled in the art that the manner of use of the exercise stroller device 10 described herein is merely one method of use and other methods of use are within the scope of the present invention.

First, the user places their child within the seat of the exercise stroller device 10, securing the infant via the integrated safety belts or safety harness system. The user then pushes the exercise stroller device 10 per their normal routine, maneuvering the exercise stroller device 10 via the first handle 18 and the second handle 20. The user can then utilize the first handle 18 and the second handle 20 to complete one of two upper body exercises. Pushing and pulling the first handle 18 and the second handle 20 in a sequential, back and forth motion, the user enjoys a low impact cardiovascular workout. Alternately, the user might extend either the first handle 18 or the second handle 20 outward from the side of the their body, thus strengthening and toning the chest, back, triceps, and biceps. As the user completes these exercises, they could gently push the exercise stroller device 10 forward, thus increasing their activity level through a brisk walk or light logs. The exercise stroller device 10 can be utilized as long as desired, at which point the parent or caregiver would remove their child from the exercise stroller device 10, storing the unit away until again needed.

The exercise stroller device 10 of the present invention is a unique product invention offering parents of infant children a number of significant benefits and advantages. Foremost, the exercise stroller device 10 provides new mothers a simple means of exercising their bodies after the birth of a child. The exercise stroller device 10 is a cleverly designed infant stroller configured specifically to enable the user to complete an upper body workout, all while pushing their child. The exercise stroller device 10 enables new moms to raise their heart rate, burn calories and tone muscles. Combining the cardiovascular benefits of walking or jogging, with those of cross training and resistance training, the exercise stroller device 10 further enables busy parents to exercise their body manner that is both fun and beneficial to both them and their child. Ideal for use by the new mom who want to shed a few pounds and tone their body following the birth of a child, the exercise stroller device 10 also provides dads a simple way in which to spend time with their newborn, while caring for their own, personal health.

Offering two distinct exercise options, users will appreciate that they could choose the workout which best suited their individual fitness level and personal exercise goals. A fun alternative to the traditional workout video or free weights, the exercise stroller device 10 offers a novel and exciting approach to exercise.

In sum, the exercise stroller device 10 is a cleverly designed invention offering new parents a simple means of achieving fitness goals. Enabling the parent to lovingly push their child in an infant stroller while simultaneously toning the muscles of their own upper body and burning calories, this unique combination infant stroller/exercise stroller device 10 proves a favorite accessory in any household with small children.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. An exercise stroller device for exercising a user's arms, shoulders, and chest muscles while walking, strolling, or running with an infant, the exercise stroller device comprising:
  a base unit;
  a plurality of wheels secured to the base unit;

a seat secured to the base unit, the infant receivable within the seat;

a first handle pivotally mounted to the base unit;

a second handle pivotally mounted to the base unit opposite the first handle; and a resistance mechanism releasably secured between the first handle and the second handle, the resistance mechanism providing resistance of movement between the first handle and the second handle;

wherein the first handle and the second handle are in a first position;

wherein the first handle and the second handle are movable in a generally outward direction relative to each other against the resistance of the resistance mechanism to a second position; and wherein the first handle and the second handle automatically return to the first position.

2. The exercise stroller device of claim 1 wherein the first handle and the second handle have a handle grip end and a secured end substantially opposite the handle grip end.

3. The exercise stroller device of claim 2 wherein the handle grip ends of the first handle and the second handle each have a handle grip.

4. The exercise stroller device of claim 2 and further comprising:
a pivoting mechanism between the secured ends of the first handle and the second handle and the base unit, the pivoting mechanism allowing the first handle and the second handle to move in a generally outward direction.

5. The exercise stroller device of claim 4 wherein the pivoting mechanism includes an aperture formed in the secured ends of the first handle and the second handle and a pin secured between two plates on the base unit, the pin insertable into the aperture of the secured ends allowing the first handle and the second handle move in a generally outward direction.

6. The exercise stroller device of claim 1 wherein the resistance mechanism is an elastic band having a first end and a second end, each of the first end and the second end has an aperture for receiving a nub formed on the first handle and the second handle.

7. The exercise stroller device of claim 6 wherein the elastic band has a centrally located opening.

8. The exercise stroller device of claim 6 wherein the first handle and the second handle each include three aligned nubs.

9. The exercise stroller device of claim 1 wherein the first handle and the second handle are configured to simultaneously be pushed and pulled in a back and forth motion, providing a cross training work out similar to that provided by elliptical machines and similar upper body equipment.

10. The exercise stroller device of claim 1 wherein the first handle and the second handle are configured for pulling outwards from the base unit of the stroller, enabling the user to mimic the resistance of a "cable crossover" exercise.

11. A method for exercising a user's arms, shoulders, and chest muscles while walking, strolling, or running with an infant, the method comprising:
providing a stroller having a base unit, a plurality of wheels secured to the base unit, and a seat secured to the base unit;
pivotally mounting a first handle to the base unit;
pivotally mounting a second handle to the base unit opposite the first handle;
providing resistance of movement between the first handle and the second handle;
initially positioning the first handle and the second handle in a first position;
moving the first handle and the second handle in a general outward direction relative to each other to a second position against the resistance; and
automatically returning the first handle and the second handle to the first position.

12. The method of claim 11 wherein the first handle and the second handle have a handle grip end and a secured end substantially opposite the handle grip end.

13. The method of claim 12 and further comprising:
providing a pivoting mechanism between the secured ends of the first handle and the second handle and the base unit.

14. The method of claim 13 and further comprising:
forming an aperture in the secured ends of the first handle and the second handle;
securing a pin secured between two plates on the base unit;
inserting the pin into the aperture of the secured ends; and
allowing the first handle and the second handle move in a generally outward direction.

15. The method of claim 12 and further comprising:
releasably securing a resistance mechanism between the first handle and the second handle.

16. The method of claim 15 and further comprising:
forming at least one nub on the first handle and the second handle;
forming an aperture in each end of the resistance mechanism; and
positioning each of the nubs in one of the apertures.

17. The method of claim 16 and further comprising:
forming a centrally located opening in the resistance mechanism.

18. The method of claim 11 and further comprising:
simultaneously pushing and pulling the first handle and the second handle in a back and forth motion, providing a cross training work out similar to that provided by elliptical machines and similar upper body equipment.

19. The method of claim 11 and further comprising:
for pulling the first handle and the second handle outwards from the base unit of the stroller, enabling the user to mimic the resistance of a "cable crossover" exercise.

20. An exercise stroller device for exercising a user's arms, shoulders, and chest muscles while walking, strolling, or running with an infant, the exercise stroller device comprising:
a base unit;
a plurality of wheels secured to the base unit;
a seat secured to the base unit, the infant receivable within the seat;
a first handle having a handle grip end and a secured end, the secured end of the first handle pivotally mounted to the base unit;
a second handle having a handle grip end and a secured end, the secured end of the second handle pivotally mounted to the base unit opposite the first handle;
a pivoting mechanism between the secured ends of the first handle and the second handle and the base unit, the pivoting mechanism allowing the first handle and the second handle to move in a generally outward direction, the pivoting mechanism having an aperture formed in the secured ends of the first handle and the second handle and a pin secured between two plates on the base unit, the pin insertable into the aperture of the secured ends allowing the first handle and the second handle move in a generally outward direction; and a resistance mechanism releasably secured between the first handle and the second handle, the resistance mechanism providing resistance of movement between the first handle and the second handle;

wherein the first handle and the second handle are in a first position;

wherein the first handle and the second handle are movable in a generally outward direction relative to each other against the resistance of the resistance mechanism to a second position; and wherein the first handle and the second handle automatically return to the first position.

* * * * *